United States Patent
Tang

(10) Patent No.: US 9,671,652 B2
(45) Date of Patent: Jun. 6, 2017

(54) LIQUID CRYSTAL PANEL AND MANUFACTURING METHOD THEREOF AND LIQUID CRYSTAL DISPLAYING DEVICE

(71) Applicant: Shenzhen China Star Optoelectronics Technology Co., Ltd., Shenzhen, Guangdong (CN)

(72) Inventor: Yuejun Tang, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 264 days.

(21) Appl. No.: 14/436,013

(22) PCT Filed: Jan. 8, 2015

(86) PCT No.: PCT/CN2015/070363
§ 371 (c)(1),
(2) Date: Apr. 15, 2015

(87) PCT Pub. No.: WO2016/106806
PCT Pub. Date: Jul. 7, 2016

(65) Prior Publication Data
US 2016/0341994 A1    Nov. 24, 2016

(30) Foreign Application Priority Data
Dec. 30, 2014 (CN) .......................... 2014 1 0844703

(51) Int. Cl.
*G02F 1/1339* (2006.01)
*G02F 1/1341* (2006.01)

(52) U.S. Cl.
CPC .......... *G02F 1/1339* (2013.01); *G02F 1/1341* (2013.01); *G02F 1/13394* (2013.01); *G02F 2001/13398* (2013.01)

(58) Field of Classification Search
None
See application file for complete search history.

(56) References Cited

U.S. PATENT DOCUMENTS 6,831,725 B2 * 12/2004 Niiya .................... G02F 1/1339
349/153

FOREIGN PATENT DOCUMENTS

CN          102262320 A  * 11/2011

* cited by examiner

*Primary Examiner* — Richard Kim
(74) *Attorney, Agent, or Firm* — Andrew C. Cheng

(57) ABSTRACT

A liquid crystal panel includes a first substrate and a second substrate opposite to the first substrate, a liquid crystal layer interposed between the first substrate and the second substrate, and an enclosure resin frame located between the first substrate and the second substrate to enclose and seal the liquid crystal layer. The enclosure resin frame surrounds the liquid crystal layer that is located in a displaying zone of the liquid crystal panel. The enclosure resin frame includes spherical supports arranged therein. The spherical supports include an inner layer and an outer layer. At least one of the outer layer and the inner layer is made of a heat-shrinkable material, or alternatively, the inner layer and the outer layer are both made of heat-shrinkable materials. Also provided are a manufacturing method of a liquid crystal panel and a liquid crystal displaying device.

16 Claims, 2 Drawing Sheets

LIQUID CRYSTAL PANEL AND MANUFACTURING METHOD THEREOF AND LIQUID CRYSTAL DISPLAYING DEVICE

CROSS REFERENCE TO RELATED APPLICATIONS

This application claims the priority of Chinese Patent Application No. 201410844703.2, entitled "Liquid Crystal Panel and Manufacturing Method Thereof and Liquid Crystal Displaying Device", filed on Dec. 30, 2014, the disclosure of which is incorporated herein by reference in its entirety.

BACKGROUND OF THE INVENTION

1. Field of the Invention

The present invention relates to the field of liquid crystal displaying, and in particular to a liquid crystal panel, a manufacturing method, and a liquid crystal displaying device.

2. The Related Arts

Currently, liquid crystal display devices, serving as display components of electronic devices, have been widely used in various electronic products for liquid crystal displaying. A liquid crystal panel comprises an array substrate and a color filter substrate that are opposite to each other and liquid crystal interposed between the array substrate and the color filter substrate. A resin frame is formed between the color filter substrate and the array substrate to enclose and seal the liquid crystal. Supports are provided between the color filter substrate and the array substrate. As such, the liquid crystal panel comprises a displaying zone, a transition zone surrounding the displaying zone, and the resin frame surrounding the transition zone. During the manufacture, one situation is that metal wiring is arranged under the resin frame and non-uniformity of the wiring may cause non-uniformity of the entire size of the resin frame, leading to deformation of the substrates supported by the resin frame. Another situation is that the density of the supports in the transition zone is small so as to cause excessively large or excessively small compression. Both situations will lead to expansion or reduction of the gap between the array substrate and the color filter substrate in the transition zone. In other words, the glass layer of the array substrate or the color filter substrate that faces the liquid crystal layer may gets deformed, leading to color difference occurring at one side or multiple sides around the displaying zone so as to severely affect the displaying quality of the displaying zone.

SUMMARY OF THE INVENTION

An object of the present invention is to provide a liquid crystal panel that alleviates the issue of color difference occurring at a perimeter of the liquid crystal panel in order to ensure displaying quality of the displaying zone.

The present invention also provides a manufacturing method of a liquid crystal panel and a liquid crystal displaying device.

A liquid crystal panel comprises a first substrate and a second substrate opposite to the first substrate, a liquid crystal layer interposed between the first substrate and the second substrate, and an enclosure resin frame located between the first substrate and the second substrate to enclose and seal the liquid crystal layer, the enclosure resin frame surrounding the liquid crystal layer that is located in a displaying zone of the liquid crystal panel, wherein the enclosure resin frame comprises spherical supports arranged therein, the spherical supports comprising an inner layer and an outer layer, at least one of the outer layer and the inner layer being made of a heat-shrinkable material, or alternatively, the inner layer and the outer layer being both made of heat-shrinkable materials.

In the above liquid crystal panel, the enclosure resin frame has a cross-section that is rectangular, the rectangle having a height of 2-10 micrometers and a width of 50-3000 micrometers.

In the above liquid crystal panel, the supports have a diameter of 2-10 micrometers.

In the above liquid crystal panel, the heat-shrinkable material comprises a heat-shrinkable polyester based light/heat sensitive material, heat-shrinkable polyester material being polylactide compounds or polysiloxane acrylate compounds.

In the above liquid crystal panel, when one of the outer layer and the inner layer is made of the heat-shrinkable material, the other layer is made of a silicon dioxide material.

In the above liquid crystal panel, after the supports are irradiated by light and gets heated, a portion of the support that is made of the heat-shrinkable material deforms, time, temperature, and area of the irradiation being of predetermined values.

In the above liquid crystal panel, the first substrate is an array substrate and the second substrate is a color filter substrate; or the first substrate is a color filter substrate and the second substrate is an array substrate.

The present invention also provides a liquid crystal displaying device, which comprises a liquid crystal panel, the liquid crystal panel comprising a first substrate and a second substrate opposite to the first substrate, a liquid crystal layer interposed between the first substrate and the second substrate, and an enclosure resin frame located between the first substrate and the second substrate to enclose and seal the liquid crystal layer, the enclosure resin frame surrounding the liquid crystal layer that is located in a displaying zone of the liquid crystal panel, wherein the enclosure resin frame comprises spherical supports arranged therein, the spherical supports comprising an inner layer and an outer layer, at least one of the outer layer and the inner layer being made of a heat-shrinkable material, or alternatively, the inner layer and the outer layer being both made of heat-shrinkable materials.

In the above liquid crystal displaying device, the heat-shrinkable material comprises a heat-shrinkable polyester based light/heat sensitive material, heat-shrinkable polyester material being polylactide compounds or polysiloxane acrylate compounds.

In the above liquid crystal displaying device, when one of the outer layer and the inner layer is made of the heat-shrinkable material, the other layer is made of a silicon dioxide material.

In the above liquid crystal displaying device, after the supports are irradiated by light and gets heated, a portion of the support that is made of the heat-shrinkable material deforms, time, temperature, and area of the irradiation being of predetermined values.

The present invention further provides a manufacturing method of a liquid crystal panel, the method comprising: providing a first substrate and a second substrate that is opposite to the first substrate;

forming an enclosure resin frame between the first substrate and the second substrate, wherein the enclosure resin frame comprises spherical supports embedded therein and the spherical supports comprises an inner layer and an outer layer, one of the outer layer and the inner layer being made of a heat-shrinkable material, or alternatively, the inner layer and the outer layer being both made of heat-shrinkable materials;

having the support and the pre-cured enclosure resin frame cured simultaneously; and filling liquid crystal between the first substrate and the second substrate and inside the enclosure resin frame, the liquid crystal being set in an area that is a displaying zone.

In the above manufacturing method of the liquid crystal panel, light irradiation to the enclosure resin frame is carried out before, during, or after the curing in order to change the size of the support.

In the above manufacturing method of the liquid crystal panel, the heat-shrinkable material comprises a heat-shrinkable polyester based light/heat sensitive material, heat-shrinkable polyester material being polylactide compounds or polysiloxane acrylate compounds.

In the above manufacturing method of the liquid crystal panel, when one of the outer layer and the inner layer is made of the heat-shrinkable material, the other layer is made of a silicon dioxide material.

In the above manufacturing method of the liquid crystal panel, after the supports are irradiated by light and gets heated, a portion of the support that is made of the heat-shrinkable material deforms, time, temperature, and area of the irradiation being of predetermined values.

The present invention provides a liquid crystal panel having a perimeter where an enclosure resin frame that is bonded to an array substrate or a color filter substrate comprises supports made of a heat-shrinkable material arranged therein so that shortening can be achieved through light irradiation and heating to realize adjustment of a gap between the array substrate and the color filter substrate so as to lessen perimeter color difference of the liquid crystal panel and improve the displaying quality of the liquid crystal panel.

BRIEF DESCRIPTION OF THE DRAWINGS

To more clearly explain the technical solutions proposed in embodiments of the present invention or those of the prior art, a brief description of the drawings that are necessary for describing the embodiments of the present invention or those of the prior art is given as follows. It is obvious that the drawings that will be described below show only some embodiments of the present invention. For those having ordinary skills of the art, other drawings may also be readily available from these attached drawings without the expense of creative effort and endeavor.

DETAILED DESCRIPTION OF THE PREFERRED EMBODIMENTS

A clear and complete description will be given to technical solutions of the embodiments of the present invention with reference to the attached drawings of the embodiments of the present invention. However, the embodiments so described are only some, but not all, of the embodiments of the present invention. Other embodiments that are available to those having ordinary skills of the art without the expense of creative effort and endeavor are considered belonging to the scope of protection of the present invention.

Figure 1:
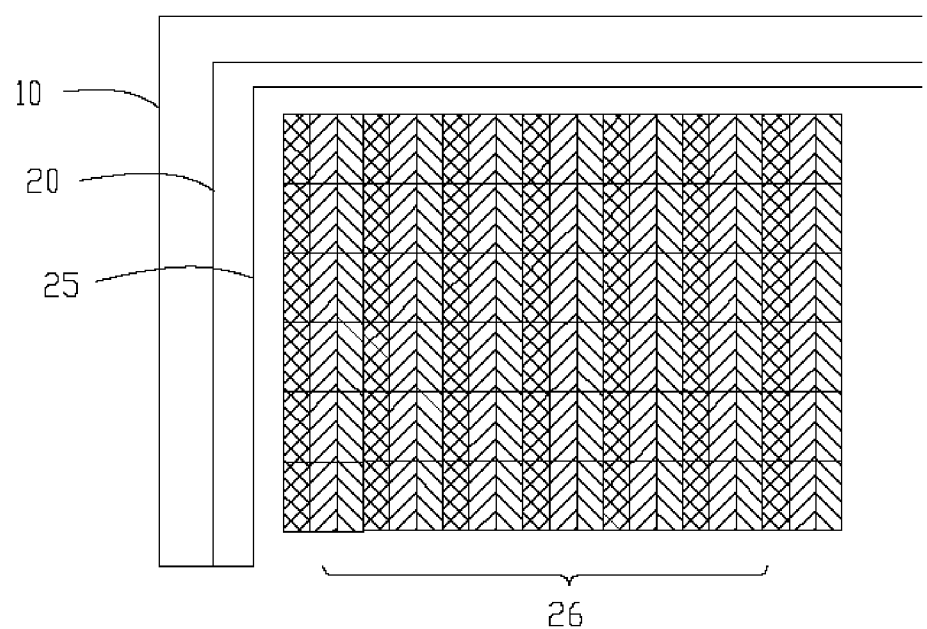
FIG. 1 is a top plan view of a portion of a liquid crystal panel according to the present invention.
Figure 2:
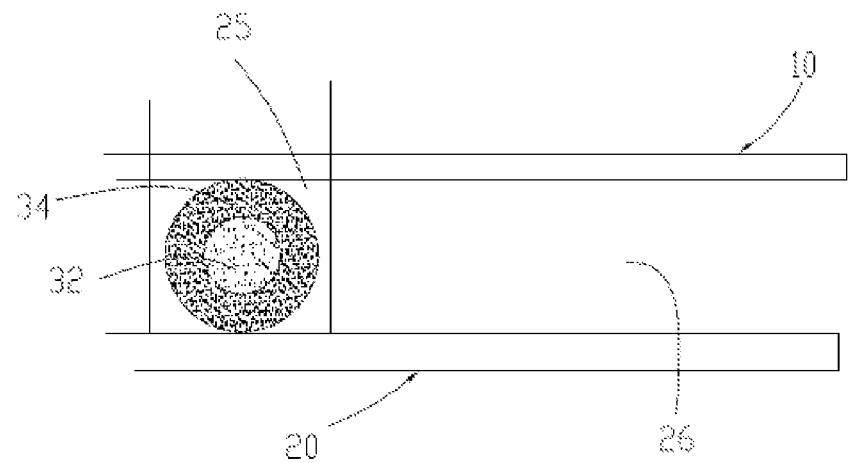
FIG. 2 is a schematic side elevational view of the liquid crystal panel of FIG. 1, in which a support has an outer layer that is made of a heat-shrinkable material.

Referring to FIGS. 1 and 2, a liquid crystal panel comprises a first substrate 10 and a second substrate 20 opposite to the first substrate 10, a liquid crystal layer interposed between the first substrate 10 and the second substrate 20, and an enclosure resin frame 25 located between the first substrate 10 and the second substrate 20 to enclose and seal the liquid crystal layer. The enclosure resin frame 25 surrounds the liquid crystal layer that is located in a displaying zone 26 of the liquid crystal panel. The enclosure resin frame 25 comprises spherical supports 30 arranged therein. The spherical supports 30 comprise an inner layer 32 and an outer layer 34. At least one of the outer layer 34 and the inner layer 32 is made of a heat-shrinkable material, or alternatively, the inner layer 32 and the outer layer 34 are both made of heat-shrinkable materials.

Further, the first substrate 10 is an array substrate and the second substrate 20 is a color filter substrate; or alternatively, the first substrate 10 is a color filter substrate and the second substrate 20 is an array substrate. In the instant embodiment, an example that the first substrate 10 is an array substrate and the second substrate 20 is a color filter substrate is taken for illustration. Further, illustration will be given by taking the array substrate and the color filter substrate at a peripheral area of the liquid crystal panel as an example. The enclosure resin frame 25 is located in a non-displaying zone of the liquid crystal panel.

Further, the enclosure resin frame 25 has a cross-section that is rectangular. The rectangle has a height of 2-10 micrometers and a width of 50-3000 micrometers.

Further, the supports 30 have a diameter of 2-10 micrometers.

Further, the heat-shrinkable material comprises a heat-shrinkable polyester based light/heat sensitive material. The heat-shrinkable polyester material can be polylactide compounds or polysiloxane acrylate compounds. The shrinkage temperature is higher than 130 degree. The supports need to be irradiated at a temperature that is higher than the processing temperatures of the panel in processes subsequent to coating of the enclosure resin frame and Laser irradiation is only allowed to irradiate a necessary portion of the support in order to ensure a desired change of the silicon sphere in the irradiation zone. Specifically, laser is used for the irradiation.

Further, after the support is irradiated by the light and gets heated, the portion of the support that is made of the heat-shrinkable material undergoes deformation. Time, temperature, and area of irradiation can be of predetermined values.

In the instant embodiment, when one of the outer layer 34 and the inner layer 32 is made of a heat-shrinkable material, the other layer is made of a silicon dioxide material. Specifically, the outer layer 34 is made of the heat-shrinkable material and the inner layer 32 is made of the silicon dioxide material. Alternatively, the outer layer 34 is made of a silicon dioxide material and the inner layer 32 is made of the heat-shrinkable material.

When the array substrate 10 and the color filter substrate 20 are affected by size non-uniformity of the enclosure resin frame 25 so that one side or multiple sides or of a perimeter of or one portion of the array substrate 10 or the color filter substrate 20 deforms, the gap between the array substrate 10 and the color filter substrate 20 gets expanded. By applying laser irradiation and heating to the support 30 at the deformation site, after the irradiation of laser, the outer layer 34 or the inner layer 32 of the support 30 shrinks due to being heated and consequently, the overall height of the support 30 is reduced, thereby lessening the height of the enclosure resin frame to maintain the gap between the array substrate 10 and the color filter substrate 20 and thus alleviating color difference at one side of the perimeter of, one portion, or multiple sides of the liquid crystal panel. Predetermined values of the time interval and temperature of heating and surface area of the support 30 are determined according to actual conditions in order to effectively prevent breaking of the liquid crystal panel.

Figure 3:
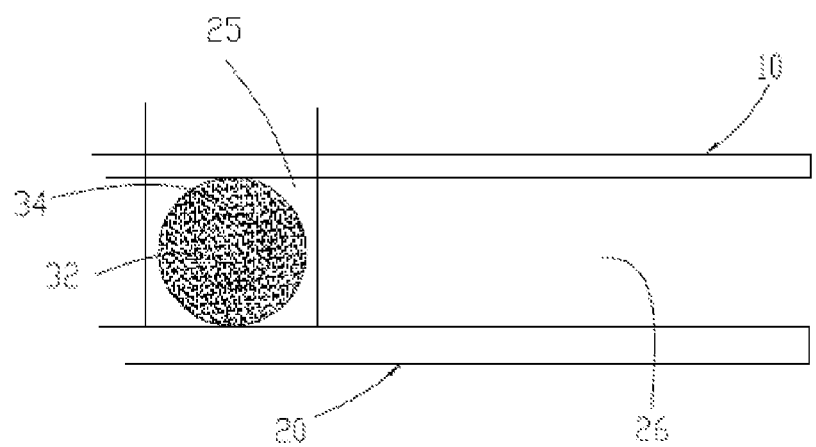
FIG. 3 is a schematic side elevational view of the liquid crystal panel of FIG. 1, in which a support has inner and outer layers, both of which are made of heat-shrinkable materials.

Referring to FIG. 3, in another embodiment of the present invention, the outer layer 34 and the inner layer 32 are both made of heat-shrinkable materials.

When the array substrate 10 and the color filter substrate 20 are affected by size non-uniformity of the enclosure resin frame 25 so that one side or multiple sides or of a perimeter of or one portion of the array substrate 10 or the color filter substrate 20 deforms, the gap between the array substrate 10 and the color filter substrate 20 gets expanded. By applying laser irradiation and heating to the support 30 at the deformation site of the enclosure resin frame 25, after the irradiation of laser, the outer layer 34 and the inner layer 32 of the support 30 shrink due to being heated and consequently, the overall height of the support 30 is reduced, thereby lessening the height of the enclosure resin frame to maintain the gap between the array substrate 10 and the color filter substrate 20 and thus alleviating color difference at one side of the perimeter of, one portion, or multiple sides of the liquid crystal panel. Predetermined values of the time interval and temperature of heating and surface area of the support 30 are determined according to actual conditions in order to effectively prevent breaking of the liquid crystal panel.

The present invention also provides a liquid crystal displaying device including the above-described liquid crystal panel.

The present invention further provides a manufacturing method of the above-described liquid crystal panel. The method comprises:

Step S1: providing a first substrate and a second substrate that is opposite to the first substrate;

Step S2: forming an enclosure resin frame between the first substrate and the second substrate, wherein the enclosure resin frame comprises spherical supports embedded therein and the spherical supports comprises an inner layer and an outer layer, one of the outer layer and the inner layer being made of a heat-shrinkable material, or alternatively, the inner layer and the outer layer being both made of heat-shrinkable materials;

Step S3: having the support and the pre-cured enclosure resin frame cured simultaneously so that the support and the enclosure resin frame that is in a liquid state undergo solidification; and Step S4: filling liquid crystal between the first substrate and the second substrate and inside the enclosure resin frame, the liquid crystal being set in an area that is a displaying zone. The process of filling the liquid crystal is an ODF (One Drop Filling) operation.

Further, laser irradiation to the enclosure resin frame can be carried out at any stage before, during, and after the curing of the enclosure resin frame in order to change the size of the support. Specifically, irradiation can be made to supports of which the sizes are not within a predetermined range before, during, or after the curing of the enclosure resin frame so as to achieve the purpose of changing size. For example, when deformations occur in some portions of the enclosure resin frame after curing, irradiation can be made only to the supports at the deformed portions. As such, the issue of color difference can be immediately handled during the manufacturing process of a liquid crystal panel.

The present invention provides a liquid crystal panel having a perimeter where an enclosure resin frame that is bonded to an array substrate or a color filter substrate comprises supports made of a heat-shrinkable material arranged therein so that shortening can be achieved through light irradiation and heating to realize adjustment of a gap between the array substrate and the color filter substrate so as to lessen perimeter color difference of the liquid crystal panel and improve the displaying quality of the liquid crystal panel.

The above illustrates only a preferred embodiment according to the present invention and is not intended to limit the scope of right of the present invention. Those having ordinary skills of the art would appreciate that various equivalent modifications that achieve all or some of the operations of the above-described embodiment and fall within scope of the attached claims are considered within the scope covered by the present invention.

What is claimed is:

1. A liquid crystal panel, comprising a first substrate and a second substrate opposite to the first substrate, a liquid crystal layer interposed between the first substrate and the second substrate, and an enclosure resin frame located between the first substrate and the second substrate to enclose and seal the liquid crystal layer, the enclosure resin frame surrounding the liquid crystal layer that is located in a displaying zone of the liquid crystal panel, wherein the enclosure resin frame comprises spherical supports arranged therein, the spherical supports comprising an inner layer and an outer layer, at least one of the outer layer and the inner layer being made of a heat-shrinkable material, or alternatively, the inner layer and the outer layer being both made of heat-shrinkable materials.

2. The liquid crystal panel as claimed in claim 1, wherein the enclosure resin frame has a cross-section that is rectangular, the rectangle having a height of 2-10 micrometers and a width of 50-3000 micrometers.

3. The liquid crystal panel as claimed in claim 2, wherein the supports have a diameter of 2-10 micrometers.

4. The liquid crystal panel as claimed in claim 3, wherein the heat-shrinkable material comprises a heat-shrinkable polyester based light/heat sensitive material, heat-shrinkable polyester material being polylactide compounds or polysiloxane acrylate compounds.

5. The liquid crystal panel as claimed in claim 1, wherein when one of the outer layer and the inner layer is made of the heat-shrinkable material, the other layer is made of a silicon dioxide material.

6. The liquid crystal panel as claimed in claim 1, wherein after the supports are irradiated by light and gets heated, a portion of the support that is made of the heat-shrinkable material deforms, time, temperature, and area of the irradiation being of predetermined values.

7. The liquid crystal panel as claimed in claim 6, wherein the first substrate is an array substrate and the second substrate is a color filter substrate; or the first substrate is a color filter substrate and the second substrate is an array substrate.

8. A liquid crystal displaying device, comprising a liquid crystal panel, the liquid crystal panel comprising a first substrate and a second substrate opposite to the first substrate, a liquid crystal layer interposed between the first substrate and the second substrate, and an enclosure resin frame located between the first substrate and the second substrate to enclose and seal the liquid crystal layer, the enclosure resin frame surrounding the liquid crystal layer that is located in a displaying zone of the liquid crystal panel, wherein the enclosure resin frame comprises spherical supports arranged therein, the spherical supports comprising an inner layer and an outer layer, at least one of the outer layer and the inner layer being made of a heat-shrinkable material, or alternatively, the inner layer and the outer layer being both made of heat-shrinkable materials.

9. The liquid crystal displaying device as claimed in claim 8, wherein the heat-shrinkable material comprises a heat-shrinkable polyester based light/heat sensitive material, heat-shrinkable polyester material being polylactide compounds or polysiloxane acrylate compounds.

10. The liquid crystal displaying device as claimed in claim 8, wherein when one of the outer layer and the inner layer is made of the heat-shrinkable material, the other layer is made of a silicon dioxide material.

11. The liquid crystal displaying device as claimed in claim 8, wherein after the supports are irradiated by light and gets heated, a portion of the support that is made of the heat-shrinkable material deforms, time, temperature, and area of the irradiation being of predetermined values.

12. A manufacturing method of a liquid crystal panel, the method comprising: providing a first substrate and a second substrate that is opposite to the first substrate;

forming an enclosure resin frame between the first substrate and the second substrate, wherein the enclosure resin frame comprises spherical supports embedded therein and the spherical supports comprises an inner layer and an outer layer, one of the outer layer and the inner layer being made of a heat-shrinkable material, or alternatively, the inner layer and the outer layer being both made of heat-shrinkable materials;

having the support and the pre-cured enclosure resin frame cured simultaneously; and filling liquid crystal between the first substrate and the second substrate and inside the enclosure resin frame, the liquid crystal being set in an area that is a displaying zone.

13. The manufacturing method of the liquid crystal panel as claimed in claim 12, wherein light irradiation to the enclosure resin frame is carried out before, during, or after the curing in order to change the size of the support.

14. The manufacturing method of the liquid crystal panel as claimed in claim 12, wherein the heat-shrinkable material comprises a heat-shrinkable polyester based light/heat sensitive material, heat-shrinkable polyester material being polylactide compounds or polysiloxane acrylate compounds.

15. The manufacturing method of the liquid crystal panel as claimed in claim 12, wherein when one of the outer layer and the inner layer is made of the heat-shrinkable material, the other layer is made of a silicon dioxide material.

16. The manufacturing method of the liquid crystal panel as claimed in claim 12, wherein after the supports are irradiated by light and gets heated, a portion of the support that is made of the heat-shrinkable material deforms, time, temperature, and area of the irradiation being of predetermined values.

* * * * *